United States Patent [19]

Fitzpatrick et al.

[11] Patent Number: 5,072,396
[45] Date of Patent: Dec. 10, 1991

[54] NAVIGATION SYSTEMS

[75] Inventors: Roger S. Fitzpatrick; Keith C. Rawlings, both of Cheltenham, Great Britain

[73] Assignee: Smiths Industries Public Limited Company, London, England

[21] Appl. No.: 607,460

[22] Filed: Oct. 31, 1990

[30] Foreign Application Priority Data

Nov. 8, 1989 [GB] United Kingdom ............... 8925196

[51] Int. Cl.⁵ ........................................ G06F 15/50
[52] U.S. Cl. ................................... 364/450; 364/449; 358/103
[58] Field of Search ............... 364/450, 453, 449, 456, 364/457; 340/988, 990, 995; 73/178 R; 342/456, 457; 358/103, 109

[56] References Cited

U.S. PATENT DOCUMENTS

| 4,700,307 | 10/1987 | Mons et al. | 364/453 |
| 4,937,751 | 6/1990 | Nimura et al. | 340/990 |
| 4,939,662 | 7/1990 | Nimura et al. | 340/995 |
| 4,942,533 | 7/1990 | Kakinami et al. | 364/449 |

FOREIGN PATENT DOCUMENTS

| 0005918 | 5/1983 | European Pat. Off. |
| 0139292 | 5/1985 | European Pat. Off. |
| 2060306 | 4/1981 | United Kingdom |
| 2116000 | 9/1983 | United Kingdom |

OTHER PUBLICATIONS

IEEE Trans. Veh. Tech, vol. VT-26-No. 1 (2/77), pp. 47-59, "A Dead-Reckoning/Map Correlation System for Automatic Vehicle Tracking", Lezniak et al.

Primary Examiner—Salvatore Cangialosi
Attorney, Agent, or Firm—Pollock, VandeSande and Priddy

[57] ABSTRACT

An aircraft navigation system has a digital map store of terrain features or man-made features in the region over which the aircraft is flying. Infra-red television cameras view the surrounding of the aircraft. Their outputs are supplied to processors in which the camera outputs are compared with a library of features transformed according to the camera viewing angle. Information about those features identified is supplied to a correlator which correlates the features against the map store to identify their location in the map and estimates the aircraft position as an output to a navigation computer. The system also indicates aircraft attitude which may be independent of known-features, from observation of the horizon. Position information can also be provided by dead reckoning from a known initial position by monitoring the change in positional relationship of a feature from the initial position to that at a later position.

14 Claims, 3 Drawing Sheets

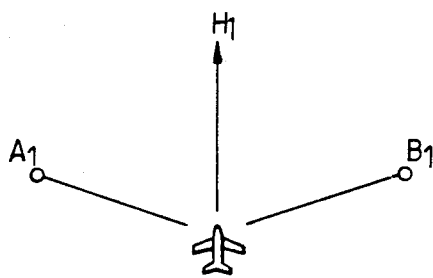
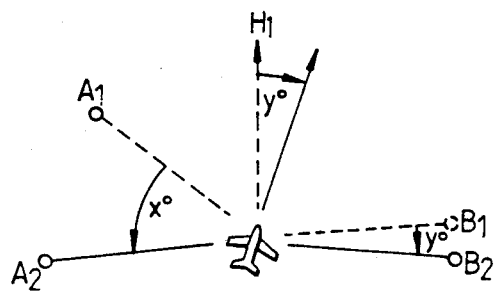
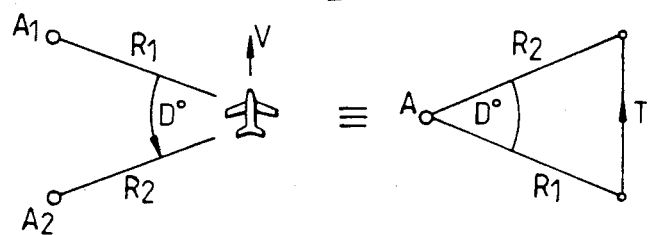
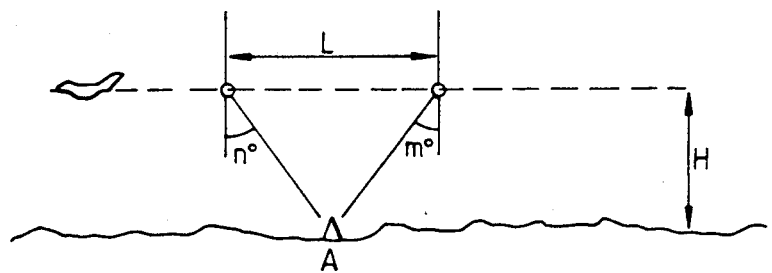

NAVIGATION SYSTEMS

BACKGROUND OF THE INVENTION

This invention relates to vehicle navigation systems.

It is desirable in many vehicles to be aware of current position as signified on a map to the best attainable degree of accuracy. In most systems, and in particular in aircraft, it is also desirable to be able to measure some if not all current values of orthogonal motion and orientation.

Preferably, current position and orientation measures are derived without reliance on cooperative external agencies such as navigation beacons. Independence of such agencies frees the vehicles from the risk of performance degradation in the event of accidental interruption or deliberate damage or distortion of their services.

Preferably, the means of measurement employed by any such vehicular navigation or orientation system is passive in respect of the non-emission of signals which would be detectable beyond the vehicle. Many such systems would thence be able to work in close proximity without interference or limits on numbers. In military operations, such systems would also be able to navigate without risk of detection.

It is known for manned vehicles to carry maps whereby crewmen may, by visual observation, judge current position. It is also known for both manned and unmanned vehicles to carry inertial navigation systems where current position may be derived by performing mathematics on the aggregation of all accelerations experienced since a last position known by some other means. Such inertial navigation systems, however, inexorably accumulate an unquantifiable positional error over time.

The inertial reference elements of such systems are also known to provide a measure of the vehicles' current orientation by comparison with a known reference, which may be pendular for vertical orientation and a magnetic compass for direction.

It is known for some vehicles to carry stellar navigation systems wherein, by multiple telescopic detections of stars and by reference to an atlas of their immutable apparent relative positions, the orientation of the vehicle in space can be computed. Measurement of the instantaneous local Earth's vertical in the stellar sphere, combined with knowledge of the Earth's rotation rate within that sphere then enables identification of the position of that local vertical on a map to within the accuracy of the measurement devices employed. Such systems are constrained by being only useable when starlight is not obscured and hence, if uninterruptible availability is required, tend to be employed only on high-altitude airborne vehicles or missiles.

It is also known for aircraft to employ active ranging devices, such as radars, to accumulate data on the ground over which they are passing and automatically to compare this data with the pre-stored terrain maps of the ground surface in search of that best-fit mathematical correlation which probabilistically describes their present position.

It is also known for computerized image processing systems receiving serial digitized inputs of matrix detections from imaging sensors to identify automatically objects viewed by the sensor, such as in GB 2206270A. The input information may be one or more frames of video imagery, digitized or otherwise. The information characterizing the object sought is assumed embedded in the serial input data and may be recognized by computational processing with reference to a digital library of such characterizing information.

It is also known that, where the angle subtended by the image of an object so recognized is measurable, and where the real size of that object perpendicular to the direction of viewing is also known by virtue of prior information, then its range or distance from the viewing sensor may be directly calculated, see GB 2228642A.

BRIEF SUMMARY OF THE INVENTION

It is an object of the present invention to enable the present position of a vehicle to be measured automatically without the cooperation of external agencies and without the emission of electromagnetic radiation.

According to one aspect of the present invention there is provided a vehicle navigation system including passive imaging sensor means arranged to view the surroundings of the vehicle and to provide an output in accordance therewith, a digital map store of the region in which the vehicle is moving, the map store containing information as to the location of individual features in the region, and the system including means for identifying the presence of the features in the field of view of the sensor means, and means for identifying the position of the vehicle from the location of the features in the field of view of the sensor means and the location of the features in the region as determined by the map store and for providing a position output in accordance therewith.

The features may include terrain features and man-made features. The map store may contain information in plan as to the location of the features, the system performing a transformation in perspective according to the viewing angle of the sensor means.

The system may include a scan controller for the sensor means, the system transforming the map store in accordance with an output from the scan controller and knowledge of vehicle attitude.

The navigation system preferably includes means for entering to the system information as to an initial position of the vehicle when the vehicle is at a known position, the system being arranged to update the position of the vehicle from the known position in accordance with the output of the sensor means.

According to another aspect of the present invention there is provided a vehicle navigation system including passive imaging sensor means arranged to view the surroundings of the vehicle and to provide an output in accordance therewith, means for entering information of an initial position of the vehicle, means for monitoring the change in positional relationship of the vehicle with respect to a feature in the field of view of the imaging sensor means from the initial position to a later position, and means for estimating the later position by dead reckoning from the initial position and the change in positional relationship.

The means for entering information as to the initial position may be manual means.

The sensor means preferably include a plurality of sensors. The sensors may be mounted to view respective different parts of the surroundings of the vehicle. The sensors may be of different kinds. The sensor means may include a television camera which may be an infra-red camera.

The system may be arranged to derive an indication of the rate of change of viewing angle of a feature, the system being arranged to utilize the indication in identifying the position of the vehicle. The system may be arranged to derive an indication of the rate of change of viewing angle of a feature, and the system being arranged to provided an indication of vehicle motion in accordance therewith.

The system may include horizon detector means, the horizon detector means being arranged to provide an output representative of the attitude of the aircraft relative to the horizon.

In an aircraft, the system may be arranged to provide an indication of roll of the aircraft by monitoring changes in the angular position of the horizon to the side of the aircraft. Similarly, the system may provide indication of the pitch of the aircraft by monitoring changes in the angular position of the horizon fore or aft of the aircraft.

The system may be arranged to identify a feature absent from the map store but which complies with rules delineating shaped features, the system deriving an indication of the rate of change of viewing angle of the feature, and the system providing an indication of vehicle motion in accordance therewith. The system may include an inertial navigation system, the position output being supplied to the inertial navigation system to update information in the inertial navigation system. The system may be arranged to provide an output in respect of vehicle movement relative to the ground, the system including an air data system arranged to provide an output indicative of the vehicle movement relative to the air, and the navigation system being arranged to provide an output indicative of wind speed and direction in accordance with the difference between the ground movement output and the air movement output. The air data system may provide an output representative of air speed, and the system being arranged to provide an output indicative of height of the aircraft from the angular rate of displacement of a ground feature relative to the aircraft.

According to a further aspect of the present invention there is provided a method of navigating a vehicle including the steps of establishing a digital map store of the region in which the vehicle will be moving containing information as to the location of individual features in the region, viewing the surroundings of the vehicle with passive imaging sensor means and providing an output in accordance therewith, identifying in the field of view of the sensor means a feature present in the map store, determining the position of the vehicle from the location of the features in the field of view of the sensor means and the location of the features in the region as determined by the map store, and providing an output representative of the position of the vehicle in accordance therewith.

According to yet another aspect of the present invention there is provided a method of navigating a vehicle including the steps of viewing the surroundings of a vehicle with passive imaging sensor means and providing an output in accordance therewith, entering information of the initial position of the vehicle, monitoring the change in positional relationship of the vehicle with respect to a feature in the field of view of the sensor means from the initial position to a later position, and estimating the later position by dead reckoning from the initial position and said change in positional relationship.

A passive navigation system in accordance with the present invention will now be described, by way of example, with reference to the accompanying drawings.

BRIEF DESCRIPTION OF THE DRAWINGS

FIG. 4A and 4B are plan views of the aircraft at different times;

FIG. 5 is a plan view of the aircraft; and

FIG. 6 is a side view of the aircraft at two different times.

With reference first to FIGS. 1 to 3, the navigation system is mounted in an aircraft P and includes three imaging sensors 1 to 3, in the form of infra-red television cameras, which are mounted on scanning mounts to view the ground below the aircraft. More particularly, sensor 1 views the ground to port and forwardly of the aircraft, sensor 2 views the ground to starboard and forwardly of the aircraft and sensor 3 views the ground below the aircraft. As shown in FIGS. 1 and 2, the camera 1 will see, during parts of its scan, the features C and D. The camera 2 will see the features E to H and the camera 3 will see the region bounded by the points A and B. Scanning of the cameras 1 to 3 is controlled by a common scan controller 4 which supplies signals to the cameras via lines 5 to 7 respectively. The sensors 1 to 3 need not be television cameras but could be other imaging sensors such as imaging radiometers, sonar arrays, other visual, ultra-violet, or infra-red sensors, staring arrays, cosmic or gamma ray sensors.

Figure 1:
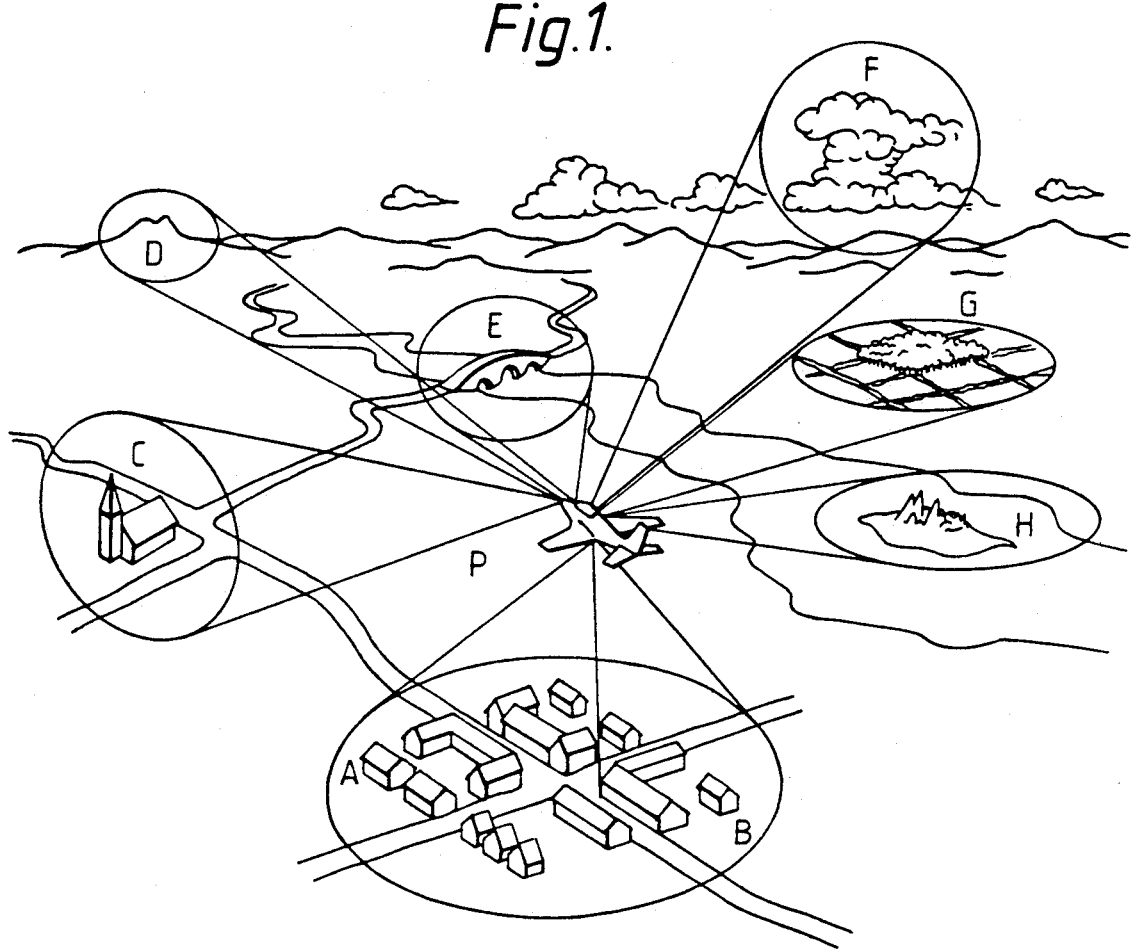
FIG. 1 is a perspective view of an aircraft including the system.
Figure 2:
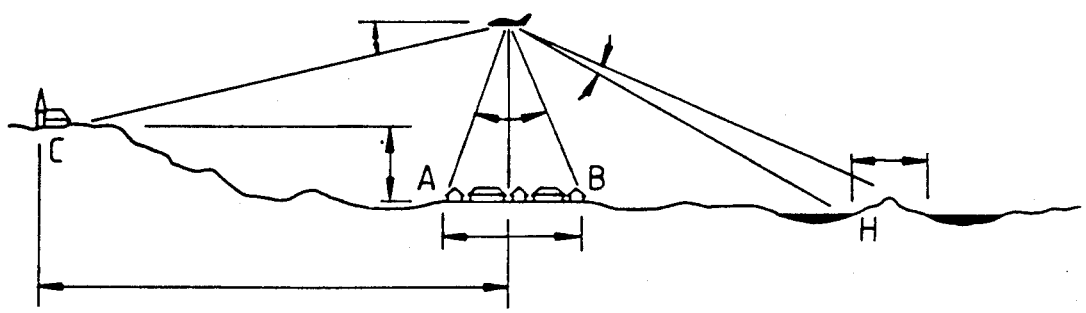
FIG. 2 is a side view of the aircraft.
Figure 3:
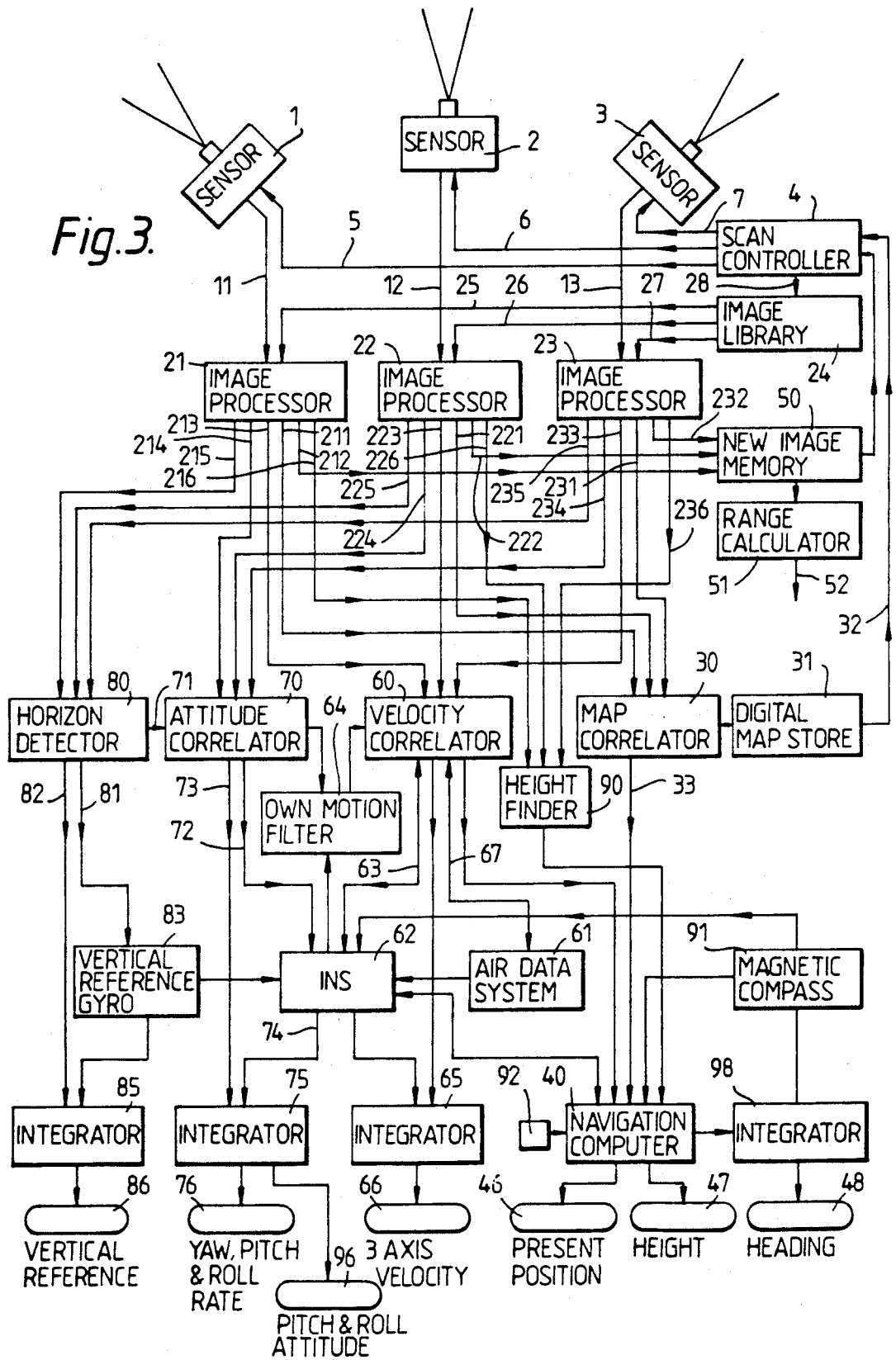
FIG. 3 illustrates schematically the construction of the system.

The output of each camera 1 to 3 is supplied via a respective cable 11 to 13 in serial digitized form to a respective image processor 21 to 23. Each processor 21 to 23 also receives input signals from an image library or store 24 via lines 25 to 27. The store 24 contains a library of the shapes of different features likely to be seen by the cameras 1 to 3, such as buildings, roads, trees, lakes, hills and the like. In general, the library will be unique to a particular region being flown over although some shapes may be common to different regions. The store 24 receives input signals on line 28 representative of the viewing angle of the cameras. The viewing angle is determined directly from knowledge of the aircraft attitude (as derived at a later stage in the system) and from knowledge of the scan angles of the cameras on the airframe. The image library 24 transforms the stored images according to the viewing angle information so that the outputs on lines 25 to 27 correspond to the perspective as seen by each camera. The image processors 21 to 23 may include processors of the kind described in patent application GB 2206270A.

Each processor 21 to 23 provides six sets of output signals on lines 211 to 216, 221 to 226 and 231 to 236 respectively. The outputs on lines 211, 221 and 231 are indicative of the coordinates of any features of the image library 24 identified by the respective cameras 1, 2 or 3. This information is supplied to a map correlator 30 which also receives an input from a digital map store 31 containing information as to the region over which the aircraft is flying and which includes location information regarding the features contained in the image library 24. The map store 31 also provides an output via line 32 to control operation of the scan controller 4 so that scan of the cameras can be concentrated on regions of particular interest, that is, regions containing features of the kind in the image library.

The map correlator 30 correlates the digital map data with information on lines 211, 221 and 231 to identify the location of features received by the cameras in relation to the digital map and hence provide an estimate of the position of the aircraft which is supplied via line 33 to a navigation computer 40. Where the features are located on the ground, or other reference surface, the topographical characteristics of which are contained in the map store 31, then, provided the position and height of the camera above the ground and the depression angle of the feature relative to the camera are known, the range to the feature can be calculated by trigonometry, as described in GB 2228642A.

The second output from each image processing unit 21 to 23 is supplied via lines 212, 222 and 232 respectively to a new image memory 50. The second output provides information as to the presence and location of selected features within the field of view of the respective camera which do not correlate with any feature in the image library 24 but which comply with rules delineating shaped features. Such features may be, for example, patches of vegetation, clouds or wind effects on water (waves or the like). Such features may be slowly changing their position or shape over time or as a function of varying viewing angles from the aircraft. However, provided this distance is sufficiently great, or their rate of change of position or shape is sufficiently small compared with the sequential viewing intervals of the system, the objects will be re-identifiable in sequential viewing frames and their change of apparent viewing angle will be measurable and amenable to processing into vehicle angular rate and velocity parameters. These non map-correlated features can be used to estimate angular rate and velocity information from the calculated change of position data when insufficient sensor information is available for direct calculation of those parameters, such as when a single map-referenced feature is in view but insufficient numbers of widely disposed features can be seen to solve the ambiguous calculation of six-axis motion.

The second output from the image processing units 21 to 23 could include information about the location of possible weapon targets or threats. These may be identified by comparison with the digital map store 31, the presence of a feature in the field of view of the camera but not present in the map store being taken as an indication that the feature is of a transient nature and, therefore, a possible threat or target. Alternatively, specific features in the image library 24 can be labelled as of selected interest and when such a feature is seen by the cameras, information regarding it is supplied to the new image memory 50. The memory 50 is coupled to a range calculator 51 which is arranged to calculate the range of the identified, selected features and provide an output accordingly on line 52 which may, for example, be supplied to weapon-aiming equipment (not shown). Range could be calculated from knowledge of the real size of the identified feature when subject to trigonometric calculation with reference to the angle subtended by its image as measured by image processors 21 to 13. Further details of such a system are given in GB 2228642A.

The system includes a horizon detector 80 which receives input signals on lines 215, 225 and 235 from the image processors 21 to 23 and constantly derives an indication of the local earth's vertical by recognition of the all-around earth's horizon. The aircraft's cameras 1 to 3 are preferably able to view nearly simultaneously in multiple directions approximating to the horizontal, and preferably in multiple parts of the electromagnetic spectrum, such as the ultraviolet. They also preferably can discriminate ambient radiation polarization effects. The image processors 21 to 23 cause the scan controller 4 to scan the cameras 1 to 3 to search for the linear image of the planetary-atmosphere junction at the horizon. While this junction is ill-defined at a single viewing opportunity, all-round multispectral observations processed between multiple sequential images which are then subjected to image-sharpening processing are capable of yielding a defined instantaneous mean horizon, by day or by night, and irrespective of cloud. The instantaneous local vertical reference can be defined from this by geometry. The instantaneous local vertical reference has many applications in vehicles, particularly in aircraft flying in non-visual conditions.

The output of the horizon detector 80 is supplied on line 71 as a vertical reference to an attitude correlator 70. Alternatively, the vertical reference may be provided by a vertical reference gyro 83 or by an inertial navigation system 62; the gyro 83 could be a component of the inertial navigation system. The output of the vertical reference gyro 83 is also supplied to the integrator 85 which integrates its output with that of the horizon detector 80 to provide an output to a display 86, or other utilization device, indicative of attitude. The attitude correlator 70 also receives signals on lines 214, 224 and 234 from the image processors 21 to 23 representative of angular rate-of-change; this includes image displacement information caused by angular motion as well as linear motion. The correlator 70 performs calculations on this information to deduce which is caused by angular motion and which is caused by linear motion. For example, with reference to FIG. 4A, the aircraft is initially located midway between two objects $A_1$ and $B_1$ on a heading $H_1$. At a time interval T later, the aircraft position is shown by FIG. 4B, at which the object $A_2$ has receded by $x^o$ horizontally whereas the other object $B_2$ has receded by $y^o$ horizontally. By calculation, this demonstrates a uniform displacement due to angular velocity $V^o = (x+y)/2$ disturbed by a change of the aircraft heading from $H_1$ to $H_2$ through a yaw angle of $Y^o = x - y$, that is, a yaw rate $Y = Y/T$ deg/sec. The range of the object, as derived by the range calculator 51, the image library 24, the map correlator 30 and the navigation computer 40, will affect the degree to which its displacement is caused by angular rather than linear motion. The greater the range, the more will its displacement be caused by angular rather than linear motion. The angular rate information is in three axes which may be either relative to the aircraft axes, in yaw, pitch and roll, or relative to external axes relative to the vertical reference. This information is supplied via line 72 to the inertial navigation system 62 and via line 74 and an integrator 75 to give a display 76 of yaw, pitch and roll rate. A separate display 96 could also be provided of pitch and roll attitude. The information supplied to the INS 62 is used to correct its accumulating errors which provides an output on line 74 to the integrator 75 so that the separately derived attitude information is combined to give a better indication than would be possible using only one set of information.

The attitude correlator 70 also provides an output to an own motion filter 64 the purpose of which is to tell a velocity correlator 60 which displacements are caused by angular rates. The velocity correlator 60 also receives corroborative barometric altitude information from an airdata system 61, via line 67, and image displacement rate data from the image processor 21 to 23, via lines 213, 223 and 233. The velocity correlator 60 performs calculations on those image displacements not caused by angular rates, which must be caused by linear motion, to provide an output representative of three axis velocities.

For example, and with reference to FIG. 5, there is shown the object $A_1$ after removal of the rotation effects. The viewing angle to the object changes through $D^o$ in a time interval of T, where its range at first observation was $R_1$ and at last observation was $R_2$. The velocity V is, therefore, given by $V = T^{-1}(R_1^2 + R_2^2 - 2 R_1 R_2 \cos D)^{\frac{1}{2}}$. Greatest accuracy will be achieved if nearby objects are chosen because of the greater angle D of displacement.

The output from the velocity correlator 60 is supplied to the INS 62, via line 63 to correct its accumulating errors. An output is also provided to an integrator 65 which, as with the integrator 75, integrates the velocity information directly from the correlator 60 with the same information derived from the INS 62 and provides a display output 66.

The velocity information provided in this way is ground speed data. The information provided by the aircraft's air data system 61 is, by contrast, representative of relative air velocity. The air data system 61 is arranged to determine the difference between this, the heading information being derived by the navigation computer 40 and the ground speed data from the correlator 60, to derive an indication of wind speed and direction which may be provided as a separate output (not shown) to a flight management system or the INS 62. Where the system is being used on a landing approach, such as for blind landing coupled to an imaging system, this output is also a three-axis windshear detector.

The system also includes a height finder unit 90 which receives information from the processors 21 to 23 via lines 216, 226 and 236. Although height can be calculated trigonometrically where a map-correlated object is located, the height finder unit 90 comes into operation where no map-correlated object is identified, that is, where distance from the object is unknown. The height finder 90, as shown in FIG. 6, relies on comparison of the angular rate of displacement to any object A which is identified as being on the ground. This, together with an indication of air speed derived from the air data system 61 and corrected for the last known wind speed, will yield height H, from the following equation:

$$H = L \cos n \cdot \cos m \, (\sin (n+m))^{-1}$$

where
m is the first viewing angle of the object A;
n is the second viewing; and
L is the distance travelled between the two viewings.

The accuracy with which the height can be calculated is greater closer to the ground for a given distance of travel L. This height information is provided by the unit 90 to a height display 47, via the navigation computer 40 or other utilization device, such as a Terrain Referenced System used by low-level military strike aircraft seeking to avoid radar detector. An indication of altitude could also be provided from knowledge of the map position of the aircraft and the ground elevation at that location.

The navigation computer 40 receives inputs from the map correlator 30, a magnetic compass 91, the velocity correlator 60, the inertial navigation system 62, and a manual entry panel 92. At the start of a voyage, or at other moments when the precise position of the aircraft is known to the navigator, he can enter this information via the panel 92 so that the navigation computer can make subsequent navigational computation by dead reckoning from the known positions. In this respect, the information on aircraft bearing and velocity are supplied to the computer 40 from the velocity correlator 60 and compass 91 in the usual way. Deviations from these simple, conventional calculations, such as caused by the effect of wind on the aircraft, are compensated for by the information from the map correlator 30 and the inertial navigation system 62. The information about the aircraft's present position is supplied to a display 46 or other utilization device. Where no feature can be identified against the map store 31, the navigation computer 40 can still derive information as to angular rate and linear velocity by using features identified in the new image memory 50 but absent from the map store. This can provide sufficient data to the navigation computer 40 to enable dead reckoning calculations to be made of the present positions until map-correlated features again come into view.

The output of the compass 91 is integrated at 98 with information from the navigation computer 40 to provide a heading output to a display 48 or other utilization device. The fore and aft components of the velocity vectors calculated by the velocity correlator 60 are cross-referenced with the map-related coordinates of the present position from the map correlator 30 to provide the heading output. Where the compass 91 becomes inoperable, such as at high latitudes, the responsibility of providing heading information is assumed by the navigation computer 40.

The present invention is not limited to use with aircraft but could, for example, be used with sea or land vehicles where the cameras are mounted to view the ground around the vehicle.

It will be appreciated that the system can be used in place of, or to supplement, existing navigational systems and does not rely on external agencies such as navigation beacons. In this respect, the system is of especial advantage in unmanned vehicles such as cruise missiles which could be targeted to their destination without the need for any external control or reliance on external agencies.

The system could be arranged to build up its own map information on an initial flight over unknown territory for use in subsequent navigation over that territory. In this respect, the system could be used in space vehicles on flights to other planets or comets where little map information is available. The vehicle would make an initial reconnaissance flight over the surface of the planet or comet during which information is supplied to the digital map store 31 and, or alternatively, the new image memory 50. This information is then used for navigation to specific regions of interest during subsequent orbits or flights over the surface.

What is claimed is:

1. A vehicle navigation system comprising: a passive imaging sensor, said sensor being mounted to view the surroundings of the vehicle and to provide an output in accordance therewith; an image library of the image characteristics and nature of a plurality of different features; means for comparing the output of said sensor with said image library to identify the presence and nature of features within the field-of-view of the sensor and to provide output signals representative of the nature of identified features; a digital map store of the region in which the vehicle is moving, the map store containing information as to the location and nature of individual features in the region; and means for correlating said output signals with said map store to identify the position of the vehicle from the relative location of the identified features in the field of view of the sensor with respect to the location of said features in the region as determined by said map store and to provide a position output in accordance therewith.

2. A vehicle navigation system according to claim 1, wherein said map store contains information in plan as to the location of the features, and wherein the system includes means to perform a transformation in perspective according to the viewing angle of the sensor.

3. A vehicle navigation system according to claim 2, wherein the system includes means for providing an output representative of vehicle attitude, and a scan controller for said sensor, and wherein said means to perform the transformation receives an output from the scan controller and said output representative of vehicle attitude.

4. A vehicle navigation system according to claim 1, including a unit by which information as to an initial position of the vehicle when the vehicle is at a known position is entered to the system, and wherein the system updates the position of the vehicle from the known position in accordance with the output of the imaging sensor.

5. A vehicle navigation system comprising: a passive imaging sensor mounted to view the surroundings of a vehicle and to provide an output in accordance therewith; a unit by which information as to an initial position of the vehicle is entered to the system; means for identifying a feature in the field of view of the imaging sensor; and wherein the system monitors the change in viewing angle with respect to the vehicle of the identified feature in the field of view of the imaging sensor from said initial position to a later position, and wherein the system estimates the later position by dead reckoning from said initial position and said change in viewing angle.

6. A vehicle navigation system according to claim 1, including means for deriving an indication of the rate of change of viewing angle of a feature, and wherein the system utilizes said indication of rate of change of viewing angle to identify the position of the vehicle.

7. A vehicle navigation system according to claim 1, including means for deriving an indication of the rate of change of viewing angle of a feature, and wherein the system provides an indication of vehicle motion in accordance therewith.

8. A vehicle navigation system for an aircraft according to claim 1 including horizon detector means, and wherein the system provides an indication of roll of the aircraft by monitoring changes in the angular position of the horizon to the side of the aircraft.

9. A vehicle navigation system for an aircraft according to claim 1 including horizon detector means, and wherein the system provides an indication of the pitch of the aircraft by monitoring changes in the angular position of the horizon fore or aft of the aircraft.

10. A vehicle navigation system according to claim 1, wherein the system includes means for identifying a feature absent from the map store but which complies with rules delineating shaped features, means for deriving an indication of the rate of change of viewing angle of the feature, and means for providing an indication of vehicle motion in accordance therewith.

11. A vehicle navigation system according to claim 1, wherein the system includes an inertial navigation system, and means supplying said position output to the inertial navigation system to update information in the inertial navigation system.

12. A vehicle navigation system according to claim 1, wherein the system provides an output in respect of vehicle movement relative to the ground, wherein the system includes an air data system that provides an output indicative of the vehicle movement relative to the air, and wherein the navigation system provides an output indicative of wind speed and direction in accordance with the difference between the ground movement output and the air movement output.

13. A vehicle navigation system for an aircraft according to claim 1, wherein the system includes an air data system, wherein said air data system provides an output representative of air speed, and wherein the system provides an output indicative of height of the aircraft from the angular rate of displacement of a ground feature relative to the aircraft.

14. A method of navigating a vehicle including the steps of: viewing the surroundings of a vehicle with passive imaging sensor means and providing an output in accordance therewith; entering information of the intial position of the vehicle; monitoring the change in viewing angle with respect to the vehicle with respect to a feature in the field of view of the sensor means from said initial position to a later position; and estimating the later position by dead reckoning from said initial position and said change in viewing angle.

* * * * *